United States Patent Office 3,344,095
Patented Sept. 26, 1967

3,344,095
RESIN BONDED MAGNESIUM OXYCHLORIDE CEMENT COMPOSITION
Burl E. Bryant, Denton, and Warren E. Bodiford, Lake Jackson, Tex., assignors to The Dow Chemical Company, Midland, Mich., a corporation of Delaware
No Drawing. Filed Feb. 18, 1965, Ser. No. 433,814
21 Claims. (Cl. 260—9)

ABSTRACT OF THE DISCLOSURE

A method of preparing improved oxychloride cements by mixing magnesium oxychloride cement fibrils containing dextrin, with monomeric styrene or liquid epoxy mixtures, and heating the same to obtain infusible solids.

The invention, broadly, is a method of making an improved oxychloride composition, the moldable settable composition so made, and the resulting hard durable set composition. It encompasses a method of imparting desirable properties to oxychloride cements and a method of preparing an oxychloride cement composition by preparing and intermixing magnesium oxychloride cement fibrils, preferably containing dextrin incorporated therein, with a selected settable resin, or with a monomeric mixture which is substantially cured to a solid in admixture with the fibrils; it encompasses the resulting novel moldable composition and the articles made when the moldable composition is formed or cast into bars, panels, or other desirable shapes and cured to a hard solid. The presence of the dextrin has a marked beneficial effect upon the magnesium oxychloride fibrils and upon the end product of the fibrils and resin and is readily distinguishable from the fibrils and from the end product in which dextrin is not present.

Magnesium oxychloride cements are known. Basic references to the oxychloride cement art include the following U.S. patents: 53,092; 860,744; 1,110,356 and 2,383,609. Other references include W. Feitknecht and F. Held, Helv. Chim. Acta 27, 1480–95 (1944); C. R. Bury and E. R. H. Davies, J. Chem. Soc. (1932) 2008; I. P. Vyrodor and A. G. Bergman, Zhur. Priklad Khim. 32, 716–23 (1959); and Walter-Levy and Bianco, Comptes Rendus 232, 730 (1951).

Although known oxychloride cement compositions are useful, they have been found to lack acceptable resistance to impact and to be less flexible than desired under certain stress conditions. The present invention provides an improved method of making a magnesium oxychloride cement composition, which preferably employs dextrin in the preparation of oxychloride fibrils, wherein a selected resin or a polymerizable monomeric mixture is admixed with the fibrils to produce, upon standing at an advanced temperature, a durable crack-resistant and impact-resistant product of improved strength, flex-strain-resistance, and durability. By use of the elongated fibrils, particularly when containing the dextrin, and the resin according to the invention, articles are made having improved properties due to the presence of two interlocking matrices, one of the fibrils and the other of the resin. Desirable composites of flexibility and strength may be attained by the judicious selection of the proportions of each component.

The resin employed in the practice of the invention is either polystyrene or epoxy resin. Methods of preparing either polystyrene or epoxy resin are well known. For example, vol. X, High Polymers, Interscience Publishers, Inc., New York, New York (1956) sets forth suitable procedures for the preparation of polystyrene. Polystyrene is normally obtained as a granulated material which does not require a hardening agent. It is normally prepared by polymerizing styrene preferably by the aid of a catalyst, by heat. If desired, monomeric styrene, together with a suitable catalyst, may be admixed with the magnesium oxychloride in the desired ratio in a mold or premixed and poured into a mold or otherwise shaped as desired and the styrene caused to polymerize in intimate admixture with the magnesium oxychloride. When so used, a solvent or organic carrier for the resin is not necessary. The preparation of settable or curable epoxy resins are discussed in Epoxy Resins by Lee and Neville, published by McGraw-Hill, New York, New York, particularly pages 7 to 18 wherein the preparation of the uncured resin is discussed and pages 30 to 61 wherein the production of the hardened or cured resin is discussed, and in High Polymers, vol. X, pages 429 to 474. Suitable agents to convert epoxy resin to a hard resin are therein discussed, such agents including among those usually used: Primary and secondary amines which are employed in an amount sufficient to provide an amino group for each oxirane group, tertiary amines in an amount of 1 to about 5% by weight of the epoxy resin, and dicarboxylic or polycarboxylic acids to provide a carboxyl group for each oxirane group; also effective but less extensively used: phenol, inorganic bases, and polyamides. For the epoxide equivalent weights of a large number of epoxy resins which may be used in the practice of the invention, reference may be made to Epoxy Resin Manual Comparative Data published by The Dow Chemical Company, Midland, Michigan. An epoxy resin having admixed therewith a suitable hardening agent in the recommended amount is termed herein a settable epoxy resin.

To carry out the invention, magnesium oxychloride fibrils are prepared by reacting MgO, $MgCl_2$, water, and preferably dextrin, in the desired ratio to produce fibrils consisting usually of some or all of the following compounds: $3MgO \cdot MgCl_2 \cdot 10H_2O$; $5MgO \cdot MgCl_2 \cdot 12H_2O$; $7MgO \cdot MgCl_2 \cdot 14H_2O$; and $9MgO \cdot MgCl_2 \cdot 14H_2O$.

The fibrils so formed are needle-like crystals. When the recommended amount of dextrin is present, the needles are largely the greatly elongated $9MgO \cdot MgCl_2 \cdot 14H_2O$ form, sometimes having an average length of from 3 to 5 times the average length obtained in the absence of dextrin. The ratio of MgO to $MgCl_2$ to employ is usually between about 2 and about 7.5 parts by weight of MgO per 100 parts of $MgCl_2$ (dry weight) and sufficient water to make a total solids therein of between about 20% and about 40%.

In the preparation of the fibrils, a mixture of between about 0.75 and about 2.5 parts by weight of MgO, per 100 parts of a 30% to 38% aqueous solution of $MgCl_2$ is prepared. It is preferred that between about 1.0 and about 2.0 parts of MgO per 100 parts by weight of a 33% to 36% by weight aqueous solution of $MgCl_2$ be employed. In a more preferred embodiment of the invention, the fibrils are prepared by admixing, with the MgO-$MgCl_2$ aqueous slurry, about 1% to about 20%, based on the weight of MgO employed, of dextrin. The dextrin may be admixed with the $MgCl_2$ aqueous solution or to the dry MgO prior to admixing them together, or it may be added to the admixture of MgO and $MgCl_2$ after admixture before the reaction has appreciably advanced. The fibrils have been found to produce an end product of improved properties, if, after preparation of the fibrils in aqueous medium, they are either partially or substantially dried and then immediately slurried at least once in an organic solvent, e.g. ethanol or methyl ethyl ketone to dissolve $MgCl_2$, and again filtered and washed at least once with a volatile solvent such as acetone to remove water and alcohol or ketone solvent, then dried prior to admixture with the solvent-borne resin.

The following procedure is illustrative of the preparation of the magnesium oxychloride cement fibrils for admixture with the resin in the practice of the invention: the components named above are heated at not lower than room temperature, usually between about 60° and 100° C. and preferably between about 85° and 95° C., accompanied by stirring, during which a clear solution first forms and is converted to a slurry of magnesium oxychloride fibrils, usually requiring at least 0.5 hour and usually at least about 1 hour. Stirring is then discontinued, the fibrils so formed allowed to settle and then separated (as by filtration), washed first with water and then with an organic solvent preferably with a water-miscible solvent, e.g. a $C_1$ to $C_3$ aliphatic alcohol, followed by an organic solvent that is miscible with both water and the first organic solvent used, e.g. a ketone of which methyl ethyl ketone and acetone are illustrative. The fibrils are thereafter dried. Best results are obtained if the slurry is allowed to stand, unagitated, for at least about 6 to about 10 hours, at a temperature between room temperature and about 100° C. and preferably between about 40° and 70° C., during which the precipitate of magnesium oxychloride fibrils settles, and the mixture then cooled (for convenience in handling) to about room temperature before separating and washing the precipitated fibrils. The fibrils thus made usually consist of some or all the magnesium oxychloride hydrates set out above. However, when at least about 1% of dextrin, and preferably 5 to 10%, based on the weight of MgO being used, is present in the reaction mixture, the fibrils are, as aforesaid, largely the elongated crystalline $$9MgO \cdot MgCl_2 \cdot 14H_2O$$

The elongated fibrils are preferred for the practice of the invention since the resulting set resin made employing them has particularly superior flex and durability properties.

When polymerized styrene is employed in the practice of the invention, it is dissolved in a suitable solvent, e.g. methyl ethyl ketone. The fibrils are then admixed with the solution of the polystyrene or with an epoxy resin containing a curing agent therefor. Stirring is provided until a substantially uniform composition results. The composition is then formed, usually by casting, i.e. placing it in a mold which is of suitable size and shape. The molds, when employed, are usually such as to form slabs, panels, or bars of the moldable composition in acordance with the intended use. Excess solvent is removed, as desired, and the so treated mass then dried, e.g. for about 8 to 16 hours at a temperature of between room temperature and about 200° C., but usually between about 50° and about 125° C. The magnesium oxychloride-resin composition cures to the durable, tough crack- and impact-resistant article of the invention.

When monomeric styrene is employed, the washed and dried magnesium oxychloride fibrils are slurried in the liquid monomer containing a suitable catalyst, e.g. a water-soluble peroxide or persulfate, and allowed to set at room temperature or preferably somewhat above room temperature.

Suction may be advantageously applied to a vent in the bottom of a mold (equipped with a strainer or filter) during the early stage of cure, when employing polystyrene for the purpose of drawing out excess solvent and, if desired, some of the polystyrene which is employed in excess of that desired to be in the final product. This technique provides more thorough contact or wetting of the fibrils by the liquid resin. The polystyrene so removed may be reused in subsequent compositions. The application of the suction (since the fibrils are of lighter weight than the resin) usually results in a lighter density product which is preferred for many structural uses where less weight is desired.

Example 1 is illustrative of a mode of preparing oxychloride fibrils containing dextrin, according to the invention.

Example 1

250 milliliters of a 34% aqueous solution of $MgCl_2$ were heated to 90° C., accompanied by stirring and, when at temperature, there was admixed therewith 0.328 gram of dextrin. The dextrin dissolved within a few minutes. Thereafter 3.28 grams of MgO were admixed therewith. After about 1 hour, the MgO had dissolved completely therein to produce a clear liquid and thereafter a precipitate began to form. The solution was held at about 90° C., accompanied by mild agitation, for a total of 4 hours during which the precipitate continued to form. Thereafter stirring was discontinued, the mixture cooled to about 50° C. and held at that temperature for about 12 hours, and then cooled to room temperature. The precipitate was separated by filtration, washed, in order, with water, ethanol, and acetone and thereafter susbtantially dried. The precipitate so prepared was weighed and analyzed and found to be 5.7 grams of unusually elongated fine needle-shaped magnesium oxychloride fibrils consisting predominantly of $9MgO \cdot MgCl_2 \cdot 14H_2O$.

The fibrils prepared above were employed in the following examples.

Example 2

Seven hundred grams of dried magnesium oxychloride fibrils, prepared as in Example 1 employing dextrin and being largely $9MgO \cdot MgCl_2 \cdot 14H_2O$, were slurried with two gallons of a solution consisting of methyl ethyl ketone containing 400 grams of polystyrene dissolved therein. Portions of the slurry were placed in each of two molds, one of which was equipped with a suction means, the portion placed therein being designated Sample 1. The other portion, designated Sample 2, was placed in a mold which was not equipped with suction means. Suction was applied to the mold equipped with suction means and excess solvent together with some dissolved polystyrene removed and the mass thereby compacted. Thereafter the two resulting formed masses were dried about 14 hours (overnight) in an oven at 85° C. to produce hard durable sheets. Sample bars were cut from each of the dried sheets and modulus of rupture tests run thereon. Other specimens were obtained from each of the sheets and subjected to extraction for twenty-four hours with methyl ethyl ketone to determine the polystyrene content. Other specimens were used to test density. Sample No. 1 (on which suction was applied after pouring into the mold thereby removing some of the resin, prior to complete polymerization), contained 25 percent polystyrene, had a density of 10.5 pounds per cubic foot and a modulus of rupture of 143 pounds per square inch. Sample No. 2 which had not had suction applied thereto contained 39 percent polystyrene, had a density of 16.18 pounds per cubic foot, and had a modulus of rupture of 227 pounds per square inch.

Example 3

In another experiment, 58.6 grams of magnesium oxychloride fibrils, prepared according to the procedure of Example 1, were slurried with 1000 grams of liquid styrene containing 5 grams of benzoyl peroxide as a catalyst. The resulting slurry was placed in a mold equipped with a suction means and excess styrene thereby removed. The resulting filter cake was wrapped in a thin saran film (Saran Wrap) and dried in an oven at 85° C. for about 15 hours. The resulting dried article was weighed and analyzed. It weighed 92.7 grams and contained 36.8 percent polystyrene. Its density was 39.5 pounds per cubic foot and the modulus of rupture was 1,250 pounds per square inch.

Example 4

Fibrils of magnesium oxychloride were prepared similarly to the procedure of Example 1 and then admixed with one gallon of a solution of methyl ethyl ketone containing dissolved polystyrene as in Example 2 but only in an amount of 2 percent by weight. The magnesium oxychloride-resin mixture so made was placed in a mold equipped with a suction means and filter and the desired amount of solvent and polystyrene removed (such technique assuring thorough wetting of the fibrils by the styrene, thereby producing a more compact mass, although of lighter weight than when more polystyrene is retained). The resulting compact mass was wrapped in saran and dried overnight in an oven at 60° C.

The polystyrene content of the dried composition so made was determined by Soxhlet extraction employing methyl ethyl ketone. The composition was 15 percent by weight polystyrene and had a density of 8.3 pounds per cubic foot. A test bar was tested for modulus of rupture and found to be 237.5 pounds per square inch. The reslurrying of the fibrils imparts greater strength to the final product.

*Example 5*

Magnesium oxychloride was prepared similarly according to the procedure of Example 1, except that the water-washed and ethanol-washed fibrils were reslurried again in ethanol and partially dried and thereafter slurried in methyl ethyl ketone before being substantially dried. 67 grams of the dried fibrils so made were admixed with 168 grams of Dow Epoxy Resin D.E.R. 331, heated to 100° under vacuum to remove as much of MEK as possible, and cooled. D.E.R. 331 is the diglycidyl ether of 4,4'-isopropylidenediphenol and has an epoxide equivalent weight of between 186 and 192. The cooled product (an extremely viscous material) was admixed with 13.35 grams of diethylenetetraacetic acid, as a curing agent, and the mixture cast into bars which hardened after a few hours to strong crack-resistant white solid bars. The bars so made were then tested. The composition was found to have a density of 58.2 pounds per cubic foot, a modulus of rupture of 2080 pounds per square inch, and to consist of 27 percent by weight of magnesium oxychloride fibrils and balance substantially solid epoxy resin. It can be readily seen that the epoxy resin tends to give a higher density, higher strength product.

The method of preparing the magnesium oxychloride fibrils, preferably having incorporated in the $MgO-MgCl_2$-water mixture a proper proportion of dextrin and preferably reslurrying the fibrils obtained from the aqueous slurry with a highly water miscible organic solvent followed with or without redrying by a water-miscible, organic miscible solvent, and admixing the so prepared fibrils with a settable epoxy resin or with either polystyrene resin dissolved in a suitable solvent or styrene and a catalyst for polymerization in situ, results in a superior composition for paneling, flooring, roofing, and general construction.

Reference to the foregoing description and examples shows that the proportions of magnesium oxychloride fibrils and resin to employ depends upon judicious selection to provide desired properties in the articles being made. Illustrative of widely differing products of the invention, polystyrene, when used in a minor proportion, as in Examples 2 to 4, provides desired stiffening reinforcement and water-repellant properties to the oxychloride composition resulting in a flexible light-weight product whereas epoxy resin, when used in a major proportion, as in Example 5, provides a high strength product in which the strength of the epoxy resin is supplemented by the flexible character of the incorporated oxychloride fibrils.

Having described our invention what we claim and desire to protect by Letters Patent is:

1. The method of imparting flexibility and crack- and impact-resistant strength properties to a magnesium oxychloride article which comprises: (1) admixing, with MgO and $MgCl_2$ in aqueous solution in the proportion of between about 2 and about 7.5 parts of MgO per 100 parts of $MgCl_2$ by weight, between about 1% about 20% of dextrin, based on the weight of MgO present; (2) reacting the mixture so made at a temperature at least as high as room temperature, accompanied by stirring, until a slurry of elongated magnesium oxychloride fibrils containing the dextrin forms, and thereafter discontinuing stirring to permit a precipitate of the fibrils to settle; (3) separating the elongated fibrils of magnesium oxychloride containing the dextrin, so made; (4) admixing with the fibrils between about 5% and about 75%, by weight thereof, of a resin selected from the class consisting of monomeric styrene together with a polymerization catalyst therefor, polystyrene dissolved in an organic solvent, and a liquid epoxy resin having a hardening agent admixed therewith which converts an epoxy resin to an infusible solid upon standing; (5) subjecting the resulting composition to a temperature of between about room temperature and about 200° C. for a time sufficient to convert the resin present to an infusible solid thereby providing a high strength crack-resistant article composed of interlocking matrices, one of the magnesium oxychloride fibrils and the other of the cross-linked resin.

2. The method of preparing a magnesium chloride composition of improved flexibility and crack- and impact-resistant properties comprising (1) admixing MgO and $MgCl_2$ in an aqueous solution in the proportion of between about 2 and 7.5 parts of MgO per 100 parts of $MgCl_2$ by weight and sufficient water to make a total solids of between about 20 and about 40 weight percent; (2) reacting the mixture so made at a temperature between about room temperature and about 100° C., accompanied by stirring, until a slurry of fibrils of magnesium oxychloride forms; (3) allowing the slurry to stand, unagitated to settle the precipitate of magnesium oxychloride fibrils; (4) separating and washing the fibrils to remove at least some of the adhering filtrate; (5) substantially drying the fibrils; (6) admixing the fibrils so made with between about 5 and about 75 percent, based on the dry weight of the resulting mixture, of a resin selected from the class consisting of settable epoxy resins containing a hardening agent, monomeric styrene containing a polymerization catalyst, and polystyrene dissolved in an organic solvent; and (7) subjecting the fibril-resin mass to a temperature at least at high as room temperature for a time sufficient to convert the mass to a hard durable crack-resistant solid.

3. The method according to claim 2 wherein between about 1 and about 20 percent, based on the weight of MgO employed, of dextrin is admixed with the

$$MgO-MgCl_2-H_2O$$

mixture of step (1).

4. The method according to claim 3 wherein the amount of dextrin employed is between about 5 and about 15 percent, based on the weight of MgO employed.

5. The method according to claim 2 wherein the fibrils of step (4) are washed first with water and then with a water-miscible organic solvent in which $MgCl_2$ is soluble for removal thereof.

6. The method according to claim 5 wherein said organic solvent is an aliphatic alcohol of from 1 to 3 carbon atoms.

7. The method according to claim 6 wherein said substantially dried fibrils are washed in a second organic solvent, said second solvent being miscible with both the alcohol employed and with water for the removal thereof and thereafter again substantially drying the so treated fibrils.

8. The method according to claim 7 wherein said second organic solvent is a ketone.

9. The method according to claim 2 wherein the resin employed is polystyrene in the amount of between about 15 and about 50 weight percent of the dried end product.

10. The method according to claim 2 wherein the resin is styrene containing a polymerization catalyst to produce polystyrene in situ.

11. The method according to claim 2 wherein the resin employed is an epoxy resin containing a hardening agent, the epoxy resin having an epoxide equivalent weight of between about 172 and about 520 in an amount of between about 25 and 75 weight percent.

12. The durable crack- and impact-resistant solid composition prepared according to claim 2.

13. The durable crack- and impact-resistant solid composition prepared according to claim 3.

14. The durable crack- and impact-resistant solid composition prepared according to claim 4.

15. The durable crack- and impact-resistant solid composition prepared according to claim 5.

16. The durable crack- and impact-resistant solid composition prepared according to claim 6.

17. The durable crack- and impact-resistant solid composition prepared according to claim 7.

18. The durable crack- and impact-resistant solid composition prepared according to claim 8.

19. The durable crack- and impact-resistant solid composition prepared according to claim 9.

20. The durable crack- and impact-resistant solid composition prepared according to claim 10.

21. The durable crack- and impact resistant solid composition prepared according to claim 11.

No references cited.

SAMUEL H. BLECH, *Primary Examiner.*

J. NORRIS, *Assistant Examiner.*